Sept. 27, 1949.　　　　　A. D. ROSE　　　　　2,483,237
RETARD GAUGE CONSTRUCTION
Filed Sept. 20, 1946
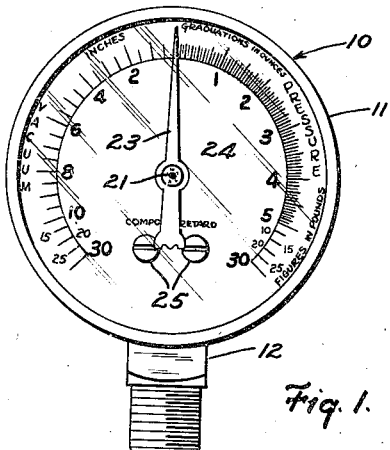
Fig. 1.
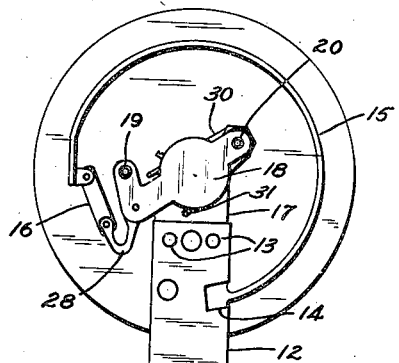
Fig. 2.
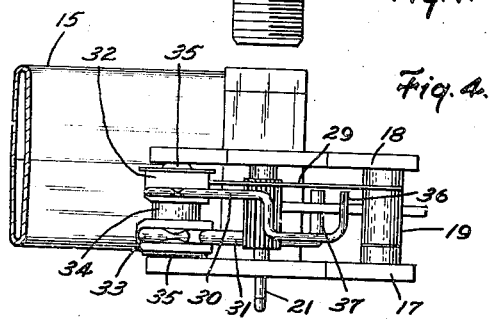
Fig. 4.
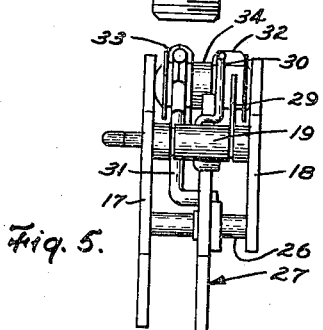
Fig. 5.
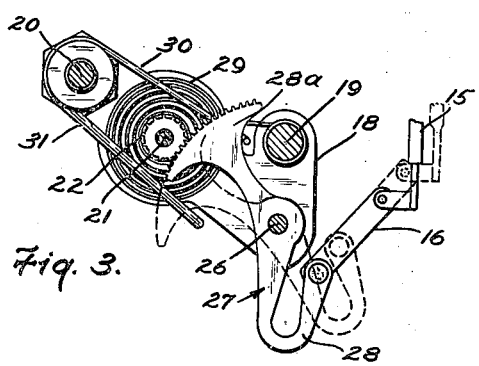
Fig. 3.
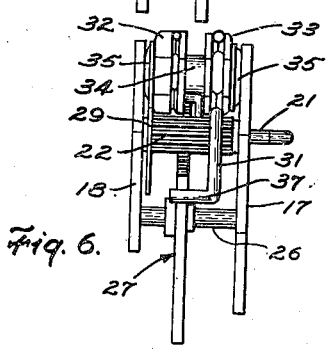
Fig. 6.
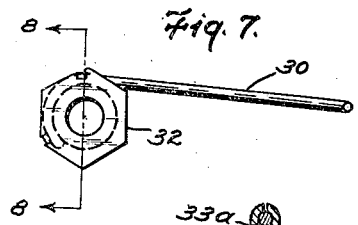
Fig. 7.
Fig. 8.
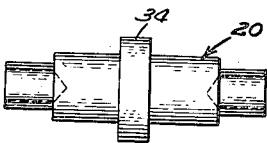
Fig. 9.
INVENTOR:
Alexander D. Rose
BY Thiess Olson & Mecklenburger
ATTYS:

Patented Sept. 27, 1949

2,483,237

UNITED STATES PATENT OFFICE 2,483,237

RETARD GAUGE CONSTRUCTION

Alexander D. Rose, Park Ridge, Ill., assignor to Jas. P. Marsh Corporation, Chicago, Ill., a corporation of Illinois Application September 20, 1946, Serial No. 698,286

5 Claims. (Cl. 73—397)

The present invention relates to gauges and has special reference to retard gauges in which the indicator mechanism moves freely to indicate pressure and vacuum accurately within the normal operating range of the gauge but is retarded in its movement for indicating pressure and vacuum above the operating range to the maximum dial readings.

More particularly the present invention relates to a compound pressure and vacuum gauge retard movement and the adjusting means therefor. Retard gauges heretofore have been difficult of adjustment and so arranged that adjustment of either the vacuum or pressure indicating retard means affected the adjustment of the other, thereby making accurate adjustment of the gauge exceedingly difficult. With the present gauge both the vacuum and pressure retard means may be readily and independently adjusted without in any way affecting the other.

An object of this invention is to provide a retard gauge having simple efficient retard mechanism.

Another object is to provide a compound vacuum and pressure indicating retard gauge in which either the pressure or vacuum retard means may be independently adjusted without in any way affecting the other.

Another object of this invention is to provide such a compound retard gauge which may be readily adjusted and when adjusted will remain fixed.

Further objects and advantages will be apparent from the following description and claims when considered together with the accompanying drawings in which:

Fig. 1 is a front elevational view of a retard gauge embodying features of this invention and having a dial graduated for vacuum and pressure readings;

Fig. 2 is a rear elevational view of the gauge shown in Fig. 1 with the casing removed;

Fig. 3 is an enlarged front elevational view of the operating mechanism of the gauge with the front plate omitted;

Fig. 4 is a top plan view of the gauge operating mechanism;

Fig. 5 is an elevational view of one end of the operating mechanism shown in Fig. 4;

Fig. 6 is an elevational view of the end of the operating mechanism opposite to that shown in Fig. 5;

Fig. 7 is a side elevational view of a spring bushing with a retard spring thereon;

Fig. 8 is a cross-sectional view taken along the line 8—8 of Fig. 7; and

Fig. 9 is an elevational view of a column for use in the present invention.

Referring more particularly to the drawings there is shown a retard gauge embodying the present invention. The gauge is of the compound type for indicating both pressure and vacuum, and comprises a casing 10 having a cover glass on the front thereof held in place by a rim 11 secured to the casing 10 by any suitable means. A post or fitting 12 extends through an opening in the bottom of the casing 10. Screws passing through the rear of the casing and threading into tapped openings 13 provided therefor in the post secure the post and casing together. The post has the usual central passageway therein communicating with an opening 14 into which one end of a Bourdon tube 15 is secured in any suitable manner so as to be in communication with the central passageway of the post 12. A pivotally mounted link 16 connects the free end of the Bourdon tube 15 to the indicating mechanism.

The pressure and vacuum indicating mechanism, including the retard means, may be assembled as a unit such as is illustrated in Figs. 3-6. This construction may comprise a pair of parallel front and rear plates 17 and 18 secured together in spaced relation by columns 19 and 20. The end portions of the columns which may be tubular and of reduced diameter as shown in Fig. 9 are passed through openings provided therefor in the plates and the outer ends are then flared or expanded as shown in Fig. 2. An indicator shaft 21 having a pinion 22 thereon is rotatably mounted in the plates 17 and 18 with the pinion 22 intermediate the two plates. One end of the indicator shaft 21 projects through the front plate 17 for receiving an indicating hand 23 thereon. The indicator hand 23 is positioned over and cooperates with the indicating dial 24 secured to the post 12 by screws 25. The markings which may be employed on the dial will be discussed hereinafter.

Rotatably mounted between the plates 17 and 18 is an arbor 26 carrying a lever 27. One end of the lever is provided with an integral gear segment 28a for meshing with the pinion 22 and an integrally formed gooseneck arm 28 at the opposite end of the lever is connected to the link 16 and thereby to the pressure responsive Bourdon tube. The indicator shaft 21 is provided with the usual hair spring 29 secured thereto and to one of the columns 19 or 20. With the above construction changes in pressure cause movement of the free end of the Bourdon tube which is transmitted by the link 16 and lever 28 to the pinion 22, indicator shaft 21, and hand 23.

One type of dial which may be employed with a compound retard gauge embodying the present invention is shown in Fig. 1. This dial is for a gauge intended to be employed in connection with a relatively low pressure and vacuum system. The pressure is marked off in ounces and pounds up to 5 pounds and in one-half inches of vacuum, up to 10 inches, this being the normal operating range of the system with which the gauge is to be used.

To cover higher pressures and vacuums, the dial has markings ranging from 5 to 30 pounds pressure and from 10 to 30 inches of vacuum, these ranges taking up dial space equal to that of 1 pound of pressure and 2 inches of vacuum in the normal range. It is therefore essential to employ retard means or mechanism for retarding movement of the indicating mechanism beyond the normal operating range.

The retard means may comprise resilient members, such as relatively stiff spring wire members 30 and 31. One end of the spring wire 30 is preferably secured to a bushing 32 provided with a peripheral groove 33a for receiving it. With the wire in place the sides of the groove 33a are peened or clamped about the wire 30 to securely hold it on the bushing 32. The wire 31 is similarly secured to the bushing 33. The bushings 32 and 33 are mounted on the column 20 on each side of the enlarged central portion or collar 34 thereof. Between the outer side of each of the bushings and its adjacent plate 17 or 18 there is arranged a compression washer 35 for clamping the bushing between it and the central collar 34 with sufficient force to prevent unintended rotation of the bushings 32 and 33. A wrench or similar tool is required to rotate the bushings about the column 20. The free ends of the spring wires 30 and 31 are bent to form contact portions 36 and 37 substantially at right angles to the rest of the spring wires.

The bushings 32 and 33 are mounted on the column 20, as illustrated particularly in Fig. 3, with the ends 36 and 37 positioned to be engaged by the sides of the lever 27 only when the lever 27 has been moved the full distance of the operating range of the gauge. In other words, the lever 27 is to engage the ends 36 and 37 of the spring wires when the lever 27 has moved a distance sufficient to cause the indicator 23 to be opposite the points indicating 5 pounds of pressure or 10 inches of vacuum. Further movement of the lever 27 is against the resiliency of the spring wires 30 and 31, and the movement of the indicator is retarded. The springs 30 and 31 are selected in accordance with the amount of retardation intended, stiffer wires being employed when it is desired to further retard the movement of the hand 23. While the resilient members for retarding the motion of the lever 27 have been described as being spring wire members, they may be made of different materials or have other form and shape, it being only necessary that the resilient members retain their resiliency and have the requisite stiffness to retard the indicating operating mechanism the required amount.

Once the resilient members 30 and 31 have been properly adjusted there is little likelihood of the retard members getting out of adjustment. However, should this happen, each may be independently adjusted without in any way affecting the other merely by rotating its bushing with a suitable wrench.

The present invention may also be embodied in a single gauge such as a pressure gauge as well as in a compound gauge for indicating both pressure and vacuum.

While I have shown and described a particular embodiment of the present invention, it is manifest that various changes and modifications may be made therein without departing from the invention and therefore I wish to be limited only by the prior art and the appended claims.

I claim:

1. In a retard gauge having a pressure responsive element, a frame, an indicator shaft, and a transmission member mounted on said frame and movable in two directions by said pressure responsive element to actuate said indicator shaft, a retard construction comprising a column associated with said frame, a pair of separately mounted relatively stiff spring wire members adjustably fixed on said column independently of each other, the free ends of said wire members being positioned on different sides of said transmission member for being engaged thereby to retard movement thereof in either direction beyond a limited range.

2. In a retard gauge having a pressure responsive element, a frame, an indicator shaft, and a transmission member mounted on said frame and movable in two directions by said pressure responsive element to actuate said indicator shaft, a retard construction comprising a column associated with said frame, a pair of bushings adjustably fixed on said column, a pair of relatively stiff spring wire members secured to said bushings and having the free ends thereof positioned on different sides of said transmission member for being engaged thereby to retard movement thereof in either direction beyond a limited range.

3. In a retard gauge having a pressure responsive element, a frame, an indicator shaft, and a transmission member mounted on said frame and movable in two directions by said pressure responsive element to actuate said indicator shaft, a retard construction comprising a column associated with said frame, a bushing adjustably fixed on said column, a relatively stiff spring wire member secured to said bushing and having a free end thereof positioned on one side of said transmission member for being engaged thereby to retard movement thereof in one direction beyond a limited range.

4. In a retard gauge having a pressure-responsive element, a frame, an indicator shaft, and a transmission member mounted on said frame and movable in two directions by said pressure-responsive element to actuate said indicator shaft, a retard construction comprising a column associated with said frame, a pair of supporting members movably fixed on said column for independent adjustment, and a pair of elongated relatively-stiff resilient members secured to said supporting members and having portions thereof positioned on different sides of said transmission member for being engaged thereby to retard movement thereof in either direction beyond a limited range.

5. In a retard gauge having a pressure-responsive element, a frame, an indicator shaft, and a transmission member mounted on said frame and movable in two directions by said pressure-responsive element to actuate said indicator shaft, a retard construction comprising a column associated with said frame, a supporting member adjustably fixed on said column, an elongated relatively-stiff resilient member secured to said supporting member and having a free end thereof positioned on one side of said transmission member for being engaged thereby to retard movement thereof in one direction beyond a limited range.

ALEXANDER D. ROSE.

REFERENCES CITED

The following references are of record in the file of this patent:

UNITED STATES PATENTS

| Number | Name | Date |
| --- | --- | --- |
| 1,414,165 | Aschenbach | Apr. 25, 1922 |
| 1,565,445 | Heise | Dec. 15, 1925 |
| 1,569,749 | Heise | Jan. 12, 1926 |
| 1,649,112 | Harrison | Nov. 15, 1927 |
| 1,701,735 | Thompson | Feb. 12, 1929 |